United States Patent [19]

Kumar et al.

[11] Patent Number: 5,845,175
[45] Date of Patent: Dec. 1, 1998

[54] RIGID INTERFERENCE GEAR MOUNT FOR ENHANCED MOTION QUALITY

[75] Inventors: Ajay Kumar, Fairport; Dhirendra C. Damji, Webster, both of N.Y.

[73] Assignee: Xerox Corporation, Stamford, Conn.

[21] Appl. No.: 49,557

[22] Filed: Mar. 27, 1998

[51] Int. Cl.$^6$ .......................... G03G 21/16; G03G 15/00
[52] U.S. Cl. .......................... 399/111; 403/375; 403/329
[58] Field of Search .......................... 403/375, 383, 403/329, 326; 399/167, 111, 279, 286, 110, 256, 265; 74/431, 434, 438

[56] References Cited

U.S. PATENT DOCUMENTS

| | | | |
|---|---|---|---|
| 3,264,016 | 8/1966 | Reisch | 403/329 |
| 3,569,903 | 3/1971 | Brishka | 403/329 X |
| 3,985,436 | 10/1976 | Tanaka et al. | 399/111 |
| 4,605,298 | 8/1986 | Russel et al. | |
| 4,693,136 | 9/1987 | Clerc et al. | 403/383 X |
| 4,900,192 | 2/1990 | Stillwagon | 403/325 |
| 4,989,020 | 1/1991 | Namba | 346/157 |
| 5,049,921 | 9/1991 | Sonobe et al. | 355/27 |
| 5,053,817 | 10/1991 | Ogiri et al. | 399/167 |
| 5,070,373 | 12/1991 | Fukano et al. | 399/322 |
| 5,087,146 | 2/1992 | Motzet et al. | 403/383 X |
| 5,106,224 | 4/1992 | van Gelderen | 403/325 X |
| 5,293,921 | 3/1994 | Marocco | 403/383 X |
| 5,294,957 | 3/1994 | Ahn | 399/111 |
| 5,428,426 | 6/1995 | Inomata et al. | |
| 5,559,581 | 9/1996 | Sugiura et al. | 399/111 |
| 5,655,182 | 8/1997 | Sanchez et al. | 399/117 |
| 5,669,042 | 9/1997 | Kobayashi et al. | 399/111 |
| 5,675,893 | 10/1997 | Yamada et al. | 29/895.22 |
| 5,740,503 | 4/1998 | Nakamura | 399/167 |
| 5,768,656 | 6/1998 | Nagasue et al. | 399/167 X |
| 5,778,284 | 7/1998 | Kumar et al. | 399/111 |
| 5,787,323 | 7/1998 | Nomura et al. | 399/111 |

FOREIGN PATENT DOCUMENTS

| | | | |
|---|---|---|---|
| 6437/32 | 3/1932 | Australia | 403/383 |
| 1002652 | 8/1965 | United Kingdom | 403/383 |

*Primary Examiner*—Matthew S. Smith
*Attorney, Agent, or Firm*—John S. Wagley

[57] ABSTRACT

A drive member for use in a printing machine is provided. The drive member cooperates with a drive shaft to transfer torque therebetween. The drive member further cooperates with a torque transferring component to transfer torque therebetween. The drive member includes a body defining an aperture therein and an axis of rotation thereof. The drive member further includes a torque transferring feature associated with the body for transferring torque between the body and the torque transferring component. The drive member further includes a fit enhancing feature extending from the body toward the aperture for enhancing the fit between the body and the drive shaft.

30 Claims, 11 Drawing Sheets

RIGID INTERFERENCE GEAR MOUNT FOR ENHANCED MOTION QUALITY

BACKGROUND OF THE INVENTION

This invention relates to electrostatographic reproduction machines, and more particularly to an economical and capacity-extendible all-in-one process cartridge for easy adaptive use in a family of compact electrostatographic reproduction machines having different volume capacities and consumable life cycles. Specifically this invention relates to such a cartridge including a printing cartridge with a positive gear mounting arrangement.

Cross reference is made to the following application filed concurrently herewith: U.S. patent application Ser. No. 09/099188 (Attorney Docket Number D/98072), entitled "Positive Gear Mount for Motion Quality" by Ajay Kumar et al.

Generally, the process of electrostatographic reproduction, as practiced in electrostatographic reproduction machines, includes charging a photoconductive member to a substantially uniform potential so as to sensitize the surface thereof. A charged portion of the photoconductive surface is exposed at an exposure station to a light image of an original document to be reproduced. Typically, an original document to be reproduced is placed in registration, either manually or by means of an automatic document handler, on a platen for such exposure.

Exposing an image of an original document as such at the exposure station, records an electrostatic latent image of the original image onto the photoconductive member. The recorded latent image is subsequently developed using a development apparatus by bringing a charged dry or liquid developer material into contact with the latent image. Two component and single component developer materials are commonly used. A typical two-component dry developer material has magnetic carrier granules with fusible toner particles adhering triboelectrically thereto. A single component dry developer material typically comprising toner particles only can also be used. The toner image formed by such development is subsequently transferred at a transfer station onto a copy sheet fed to such transfer station, and on which the toner particles image is then heated and permanently fused so as to form a "hardcopy" of the original image.

It is well known to provide a number of the elements and components, of an electrostatographic reproduction machine, in the form of a customer or user replaceable unit (CRU). Typically such units are each formed as a cartridge that can be inserted or removed from the machine frame by a customer or user. Reproduction machines such as copiers and printers ordinarily include consumable materials such as toner, volume limiting components such as a waste toner container, and life cycle limiting components such as a photoreceptor and a cleaning device. Because these elements of the copying machine or printer must be replaced frequently, they are more likely to be incorporated into a replaceable cartridge as above.

There are therefore various types and sizes of cartridges, varying from single machine element cartridges such as a toner cartridge, to all-in-one electrostatographic toner image forming and transfer process cartridges. The design, particularly of an all-in-one cartridge can be very costly and complicated by a need to optimize the life cycles of different elements, as well as to integrate all the included elements, while not undermining the image quality. This is particularly true for all-in-one process cartridges to be used in a family of compact electrostatographic reproduction machines having different volume capacities and elements having different life cycles.

There is therefore a need for a quality image producing, economical and capacity-extendible all-in-one process cartridge that is easily adapted for use in various machines in a family of compact electrostatographic reproduction machines having different volume capacities and elements with different life cycles.

Printing or process cartridges include a number of components which rotate. For example, such components include a photoconductive drum, a developer roll, augers, and agitators which are used to move the marking particles about the toner cartridge. These rotating elements are rotated by a motor or motors connected thereto. For simplicity and to reduce cost, at least some of the rotating components are mechanically interconnected by means of a mechanical drive train. The slow rotating speeds of the shafts within a printing cartridge often are accommodated by a transmission consisting of several meshing gears.

The use of a number of gears meshing together to rotate the elements of the printing cartridge require that a large, rigid housing be used to accommodate the gear forces utilized in the printing machine. The gears are typically positioned at ends of the shafts which the gears are designed to rotate.

The relative rotational speeds of the paddles, augers, photoreceptors and developer rolls frequently need to be adjusted to optimize the performance of the machine and to improve quality. Often, many gears may need to be changed to speed up or slow down only one particular rotating mechanism.

To promote recycleability and to keep manufacturing and material costs to a minimum, the gears in a process cartridge typically are made of plastic. These gears wear quickly, have low precision, and as such may be responsible for motion quality problems including deletion and banding errors.

The gears, particularly if they are helical gears, require axial restraints and, in the case of helical gears, require thrust faces to accommodate the thrust from the gear forces.

The gears are often mounted or assembled onto shafts. The shafts may be in the form of paddles, augers, photoreceptors or developer rolls. The mounting of the gears onto the shaft is typically accomplished by a cylindrical journal on the ends of the shafts to which the cylindrical bore of the gear is matingly fitted. To provide for enhanced torque carrying capacity, the shaft may include a flat which is matingly fitted with a flat on the bore of the gear.

A typical prior art gear is shown as gear 1 in FIG. 9. The gear 1 includes teeth 2 located on the periphery thereof. Centrally located within the gear 1 is a bore 3. The bore 3 is matingly fitted to shaft 4. The bore 3 includes a flat 5 which cooperates with flat 6 of the shaft 4. Manufacturing tolerances for the shaft 4 and the gear 1 require the shaft 4 and the bore 3 to have clearance therebetween. Thus, as the gear 1 and the shaft 4 have relative motion therebetween the shaft 4 may move from first position 7 to second position 8. The relative motion between the gear 1 and the shaft 4 contribute to image quality problems as previously mentioned. In particular, the relative motion between the gear and the shaft causes deletion and banding errors. This can occur because the sheet may advance more quickly than the photoconductor or conversely the photoconductor may advance more quickly than the sheet.

The following disclosures may be relevant to various aspects of the present invention:

U.S. Pat. No. 5,675,893

Patentee: Yamada et al.

Issue Date: Oct. 14, 1997

U.S. Pat. No. 5,669,042

Patentee: Kobayashi et al.

Issue Date: Sep. 16, 1997

U.S. Pat. No. 5,655,182

Patentee: Sanchez et al.

Issue Date: Aug. 5, 1997

U.S. Pat. No. 5,428,426

Patentee: Inomata et al.

Issue Date: Jun. 27, 1995

U.S. Pat. No. 5,049,921

Patentee: Sonobe et al.

Issue Date: Sep. 17, 1991

U.S. Pat. No. 4,989,020

Patentee: Namba

Issue Date: Jan. 29, 1991

U.S. Pat. No. 4,605,298

Patentee: Russel et al.

Issue Date: Aug. 12, 1986

U.S. patent application Ser. No. 08/970,313

Applicants: Kumar, et al.

Filing Date: Nov. 14, 1997

U.S. Pat. No. 5,675,893 discloses a gear for use in a photosensitive drum of a printing machine. The gear has a flange formed on the flange thereof. Four thrusting members are fitted into the flange. The fit of the thrusting members onto the gear serves to prevent play loosening and dislocation between the drum and the gear.

U.S. Pat. No. 5,669,042 discloses a printing machine including a photoconductive drum and a gear train to provide rotational motion thereto. The drum includes a flange gear and a transfer roll gear which are secured to the drum by adhesive or press fit.

U.S. Pat. No. 5,655,182 discloses a reusable photoreceptor assembly for a printing machine. The photoreceptor assembly includes a gear assembly which is removable from the photoreceptor. A square leaf spring or ring is used to secure and remove the gear assembly to and from the photoreceptor.

U.S. Pat. No. 5,428,426 discloses a printing cartridge for a printing machine. The printing cartridge includes a transfer gear which is secured to a transfer drum which mates with a drum gear on the photosensitive drum. To avoid problems with backlash between the gears, the transfer drum is rotated by the photosensitive drum by friction force transmitting layer of the transfer drum when backlash otherwise may cause slippage therebetween.

U.S. Pat. No. 5,049,921 discloses a sheet cartridge for a printing machine. The sheet cartridge includes a sensor element for detecting the non-rotation of a take up shaft or a slack of the recording medium to assure image quality.

U.S. Pat. No. 4,989,020 discloses a printing machine including printing heads which are rotated by gears. The gears are engaged with opposite gears by the same teeth and in the same state with respect to each other. Printing errors caused by pitch errors will thereby be minimized.

U.S. Pat. No. 4,605,298 discloses a printing machine having gear teeth with increased backlash. The receiver member when present in the nip causes the web and receiver member to move at the same speed without slip or backlash.

U.S. patent application Ser. No. 08/970,313 discloses a process cartridge for use in a printing machine. The process cartridge includes a housing having a first support surface and a second support surface. The housing further includes a first member rotatably secured to the housing at the first support surface and the second support surface. The housing further includes a second member spaced from the first member and rotatably secured to the housing at the first support surface and the second support surface. The housing further includes a first gear operably associated with the first member and rotatable therewith. The housing further includes a second gear operably associated with the second member and rotatable therewith. The first gear and the second gear are positioned adjacent the first support surface.

SUMMARY OF THE INVENTION

In accordance with one aspect of the present invention, there is provided a drive member for use in a printing machine. The drive member cooperates with a drive shaft to transfer torque therebetween. The drive member further cooperates with a torque transferring component to transfer torque therebetween. The drive member includes a body defining an aperture therein and an axis of rotation thereof. The drive member further includes a torque transferring feature associated with the body for transferring torque between the body and the torque transferring component. The drive member further includes a fit enhancing feature extending from the body toward the aperture for enhancing the fit between the body and the drive shaft.

In accordance with one aspect of the present invention, there is provided a process cartridge for use in a printing machine. The process cartridge includes a torque transferring component and a drive shaft. The process cartridge further includes a drive member cooperating with the drive shaft. The drive shaft is adapted to transfer torque therebetween. The drive member cooperates with the torque transferring component to transfer torque therebetween. The drive member includes a body defining an aperture therein and an axis of rotation thereof. The drive member further includes a torque transferring feature associated with the body for transferring torque between the body and the torque transferring component. The drive member further includes a fit enhancing feature extending from the body toward the aperture for enhancing the fit between the body and the drive shaft.

In accordance with another aspect of the present invention, there is provided an electrophotographic printing machine of the type including a process cartridge. The process cartridge includes a torque transferring component and a drive shaft. The process cartridge further includes a drive member cooperating with the drive shaft. The drive shaft is adapted to transfer torque therebetween. The drive member cooperates with the torque transferring component to transfer torque therebetween. The drive member includes a body defining an aperture therein and an axis of rotation thereof. The drive member further includes a torque transferring feature associated with the body for transferring torque between the body and the torque transferring component. The drive member further includes a fit enhancing feature extending from the body toward the aperture for enhancing the fit between the body and the drive shaft.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
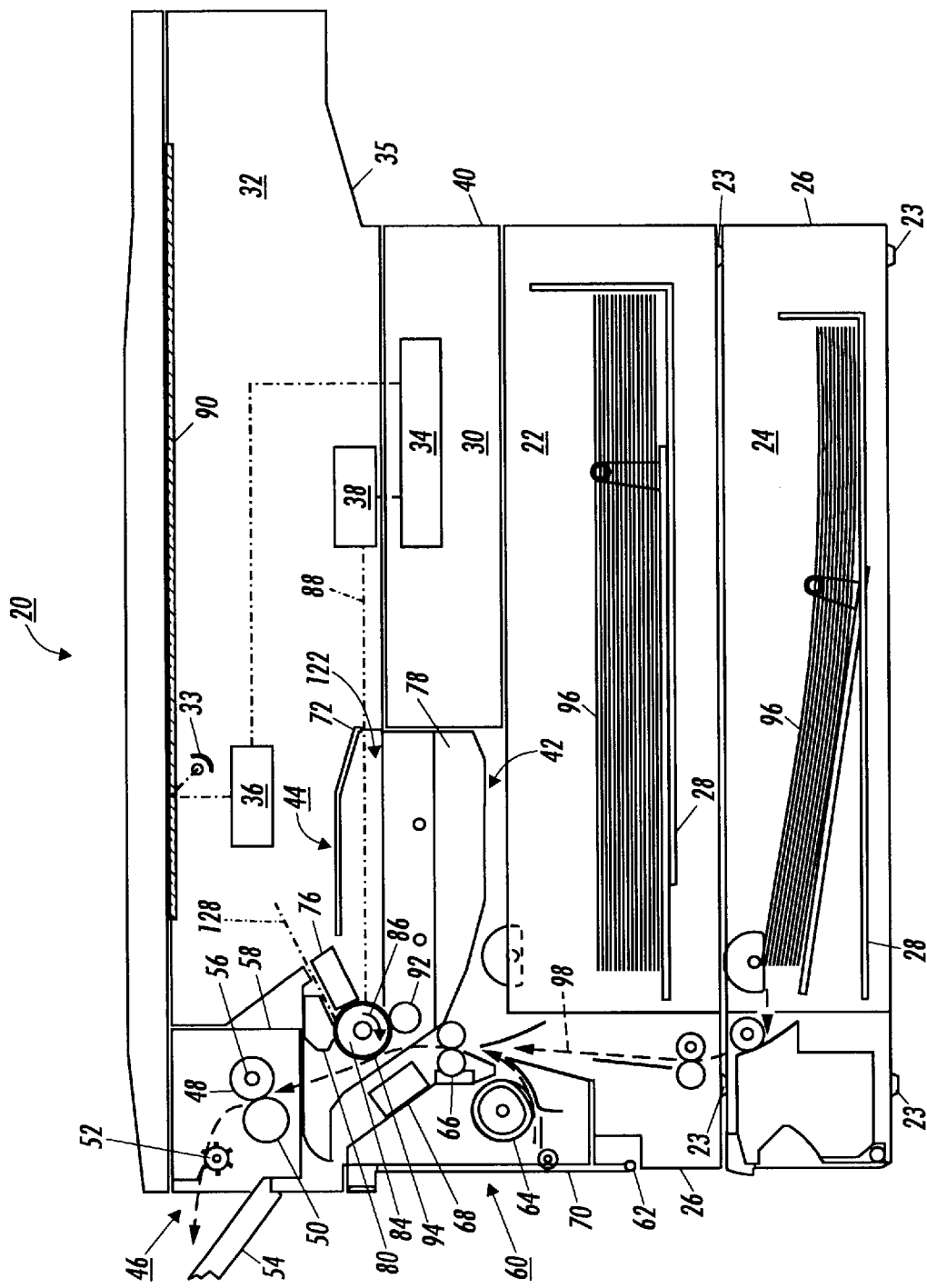
FIG. 1 is a front vertical illustration of an exemplary compact electrostatographic reproduction machine comprising separately framed mutually aligning modules in accordance with the present invention.
Figure 9:
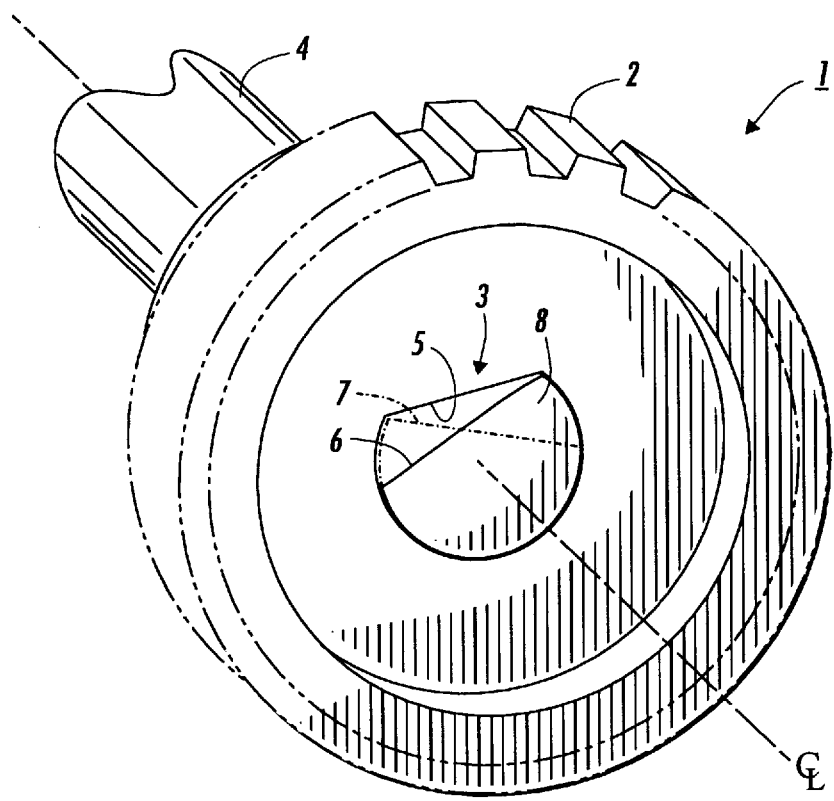
FIG. 9 is a perspective view of a prior art gear.

Referring now to FIG. 1 and 9, there is illustrated a frameless exemplary compact electrostatographic reproduction machine 20 comprising separately framed mutually aligning modules according to the present invention. The compact machine 20 is frameless, meaning that it does not have a separate machine frame to which electrostatographic process subsystems are assembled, aligned to the frame, and then aligned relative to one another as is typically the case in conventional machines. Instead, the architecture of the compact machine 20 is comprised of a number of individually framed, and mutually aligning machine modules that variously include pre-aligned electrostatographic active process subsystems.

As shown, the frameless machine 20 comprises at least a framed copy sheet input module (CIM) 22. Preferably, the machine 20 comprises a pair of copy sheet input modules, a main or primary module the CIM 22, and an auxiliary module the (ACIM) 24, each of which has a set of legs 23 that can support the machine 20 on a surface, therefore suitably enabling each CIM 22, 24 to form a base of the machine 20. As also shown, each copy sheet input module (CIM, ACIM) includes a module frame 26 and a copy sheet stacking and lifting cassette tray assembly 28 that is slidably movable in and out relative to the module frame 26. When as preferred here, the machine 20 includes two copy sheet input modules, the very base module is considered the auxiliary module (the ACIM), and the top module which mounts and mutually aligns against the base module is considered the primary module (the CIM).

The machine 20 next comprises a framed electronic control and power supply (ECS/PS) module 30, that as shown mounts onto, and is mutually aligned against the CIM 22 (which preferably is the top or only copy sheet input module). A framed latent image forming imager module 32 then mounts over and is mutually aligned against the ECS/PS module. The ECS/PS module 30 includes all controls and power supplies (not shown) for all the modules and processes of the machine 20. It also includes an image processing pipeline unit (IPP) 34 for managing and processing raw digitized images from a Raster Input Scanner (RIS) 36, and generating processed digitized images for a Raster Output Scanner (ROS) 38. The ECS/PS module 30 also includes harnessless interconnect boards and inter-module connectors (not shown), that provide all power and logic paths to the rest of the machine modules. An interconnect board (PWB) (not shown) connects the ECS controller and power supply boards (not shown) to the inter-module connectors, as well as locates all of the connectors to the other modules in such a manner that their mating connectors would automatically plug into the ECS/PS module during the final assembly of the machine 20. Importantly, the ECS/PS module 30 includes a module frame 40 to which the active components of the module as above are mounted, and which forms a covered portion of the machine 20, as well as locates, mutually aligns, and mounts to adjacent framed modules, such as the CIM 22 and the imager module 32.

The framed copy sheet input modules 22, 24, the ECS/PS module 30, and the imager module 32, as mounted above, define a cavity 42. The machine 20 importantly includes a customer replaceable, all-in-one CRU or process cartridge module 44 that is insertably and removably mounted within the cavity 42, and in which it is mutually aligned with, and operatively connected to, the framed CIM, ECS/PS and imager modules 22, 30, 32.

As further shown, the machine 20 includes a framed fuser module 46, that is mounted above the process cartridge module 44, as well as adjacent an end of the imager module 32. The fuser module 46 comprises a pair of fuser rolls 48, 50, and at least an exit roll 52 for moving an image carrying sheet through, and out of, the fuser module 46 into an output or exit tray 54. The fuser module also includes a heater lamp 56, temperature sensing means (not shown), paper path handling baffles (not shown), and a module frame 58 to which the active components of the module, as above, are mounted, and which forms a covered portion of the machine 20, as well as locates, mutually aligns, and mounts to adjacent framed modules, such as the imager module 32 and the process cartridge module 44.

The machine then includes an active component framed door module 60 that is mounted pivotably at pivot point 62 to an end of the CIM 22. The door module 60 as mounted, is pivotable from a substantially closed vertical position into an open near-horizontal position in order to provide access to the process cartridge module 44, as well as for jam clearance of jammed sheets being fed from the CIM 22. The door module 60 comprises active components including a bypass feeder assembly 64, sheet registration rolls 66, toner image transfer and detack devices 68, and the fused image output or exit tray 54. The door module 60 also includes drive coupling components and electrical connectors (not shown), and importantly, a module frame 70 to which the active components of the module as above are mounted, and which forms a covered portion of the machine 20, as well as, locates, mutually aligns, and mounts to adjacent framed modules, such as the CIM 22, the process cartridge module 44, and the fuser module 46.

More specifically, the machine 20 is a desktop digital copier, and each of the modules 22, 24, 30, 32, 44, 48, 60, is a high level assembly comprising a self-containing frame and active electrostatographic process components specified for sourcing, and enabled as a complete and shippable product. It is believed that some existing digital and light lens reproduction machines may contain selective electrostatographic modules that are partitioned for mounting to a machine frame, and in such a manner that they could be designed and manufactured by a supplier. However, there are no known such machines that have no separate machine frame but are comprised of framed modules that are each designed and supplied as self-standing, specable (i.e. separately specified with interface inputs and outputs), testable, and shippable module units, and that are specifically crafted and partitioned for enabling all of the critical electrostatographic functions upon a simple assembly. A unique advantage of the machine 20 of the present invention as such is that its self-standing, specable, testable, and shippable module units specifically allow for high level sourcing to a small set of module-specific skilled production suppliers. Such high level sourcing greatly optimizes the quality, the total cost, and the time of delivering of the final product, the machine 20.

Referring now to FIGS. 1–6, the CRU or process cartridge module 44 generally comprises a module housing subassembly 72, a photoreceptor subassembly 74, a charging subassembly 76, a developer subassembly 78 including a source of fresh developer material, a cleaning subassembly 80 for removing residual toner as waste toner from a surface of the photoreceptor, and a waste toner sump subassembly 82 for storing waste toner. The module housing subassembly 72 of the CRU or process cartridge module 44 importantly provides and includes supporting, locating and aligning structures, as well as driving components for the process cartridge module 44.

Still referring to FIG. 1, operation of an imaging cycle of the machine 20 using the all-in-one process cartridge module 44 generally, can be briefly described as follows. Initially, a photoreceptor in the form of a photoconductive drum 84 of the customer replaceable unit (CRU) or process cartridge module 44, rotating in the direction of the arrow 86, is charged by the charging subassembly 76. The charged portion of the drum is then transported to an imaging/exposing light 88 from the ROS 38 which forms a latent image on the drum 84, corresponding to an image of a document positioned on a platen 90, via the imager module 32. It will also be understood that the imager module 32 can easily be changed from a digital scanning module to a light lens imaging module.

The portion of the drum 84 bearing a latent image is then rotated to the developer subassembly 78 where the latent image is developed with developer material such as with charged single component magnetic toner using a magnetic developer roll 92 of the process cartridge module 44. The developed image on the drum 84 is then rotated to a near vertical transfer point 94 where the toner image is transferred to a copy sheet substrate 96 fed from the CIM 22 or ACIM 22 along a copy sheet or substrate path 98. In this case, the detack device 68 of the door module 60 is provided for charging the back of the copy sheet substrate (not shown) at the transfer point 94, in order to attract the charged toner image from the photoconductive drum 84 onto the copy sheet substrate.

The copy sheet substrate with the transferred toner image thereon, is then directed to the fuser module 46, where the heated fuser roll 48 and pressure roll 50 rotatably cooperate to heat, fuse and fix the toner image onto the copy sheet substrate. The copy sheet substrate then, as is well known, may be selectively transported to the output tray 54 or to another post-fusing operation.

The portion of the drum 84 from which the developed toner image was transferred is then advanced to the cleaning subassembly 80 where residual toner and residual charge on the drum 84 are removed therefrom. The imaging cycle of the machine 20 using the drum 84 can then be repeated for forming and transferring another toner image as the cleaned portion again comes under the charging subassembly 76.

The detailed and specific advantageous aspects of the structure and operation of the all-in-one CRU or process cartridge module 44, will now be described with particular reference to FIGS. 1 to 6. As shown, the all-in-one CRU or process cartridge module 44, generally includes six subassemblies comprising the module housing subassembly 72 (FIG. 2); the cleaning subassembly 80; the photoreceptor subassembly 74; the charging subassembly 76; the developer subassembly 78 (FIG. 3); and the waste toner sump subassembly 82. Generally, the function of the all-in-one CRU or process cartridge module 44 in the machine 20 is to electrostatically form a latent image, develop such latent image into a toner image through toner development, and transfer the toner image unfused onto a printing medium, such as a sheet of paper. The CRU or process cartridge module is left-side accessible to an operator facing the CIM 22 by opening the door module 60 (FIG. 1). Once the door module is opened, an operator or customer can remove or insert the CRU or process cartridge module 44 with one hand.

Figure 2:
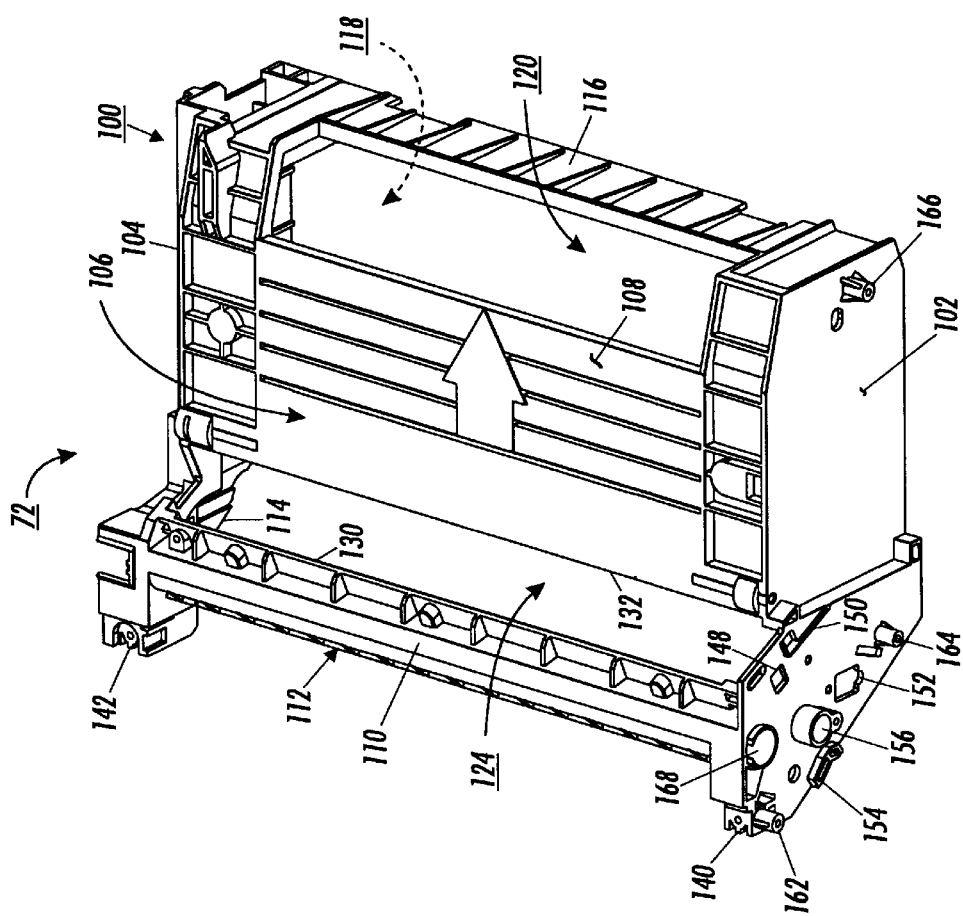
FIG. 2 is a top perspective view of the module housing of the CRU or process cartridge module of the machine of FIG. 1.
Figure 3:
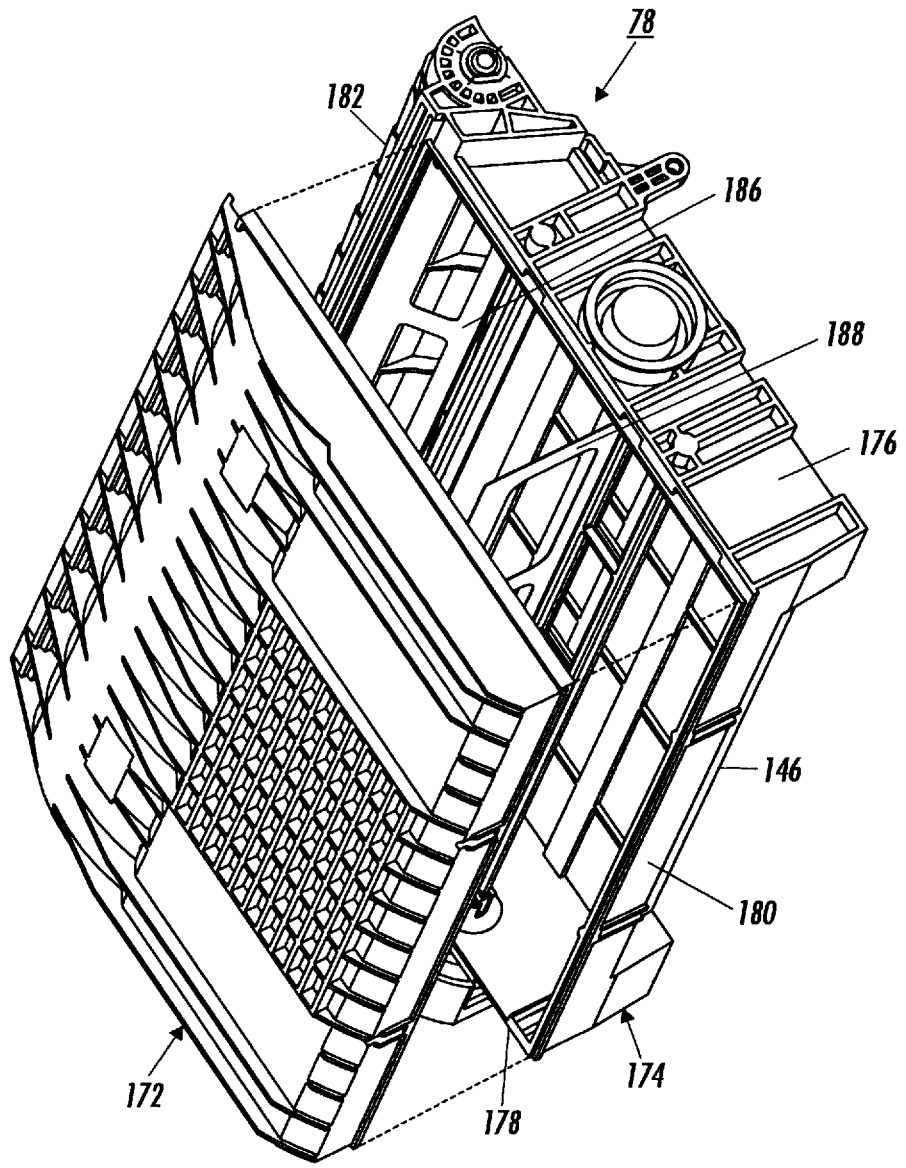
FIG. 3 is a bottom perspective view of the developer subassembly of the CRU or process cartridge module of the machine of FIG. 1 with the bottom of the developer housing unattached.

Referring now to FIGS. 1–6, the module housing subassembly 72 is illustrated (FIG. 2). As shown, it comprises a generally rectangular and inverted trough shaped module housing 100 having a first side wall 102, a second and opposite side wall 104, a top wall 106 including a substantially horizontal portion 108 and a nearly vertical portion 110 defining a raised rear end 112 (rear as considered relative to the process cartridge 44 being inserted into the cavity 42). There is no rear wall, thus resulting in an open rear end 114 for mounting the photoreceptor subassembly 74. The trough shaped module housing also includes a front end wall 116 that connects at an angle to the top wall 106. The trough shaped module housing 100 of course, has no bottom wall, and hence as inverted, it defines a trough region 118 that to is wide open for assembling the developer subassembly 78 (FIG. 3). The top wall 106 and the front end wall 116 each include a first cutout 120 formed through their adjoining corner for partially defining a first light path 122 (FIG. 1) for the exposure light 88 from the ROS 38 of the imager module 32. The top wall 106 also includes a second cutout 124 formed thereinto at the adjoining angle between the horizontal 108 and near vertical 110 portions thereof for mounting the charging subassembly 76 (FIG. 5), and for partially defining a second light path 126 (FIGS. 1 and 6) for an erase light 128 being focused into the photoreceptor area at the raised rear end 112 of the module housing 100.

Importantly, the module housing 100 includes two top wall cross-sectional surfaces 130, 132 defining the second cutout 124, and one 130, of these cross-sectional wall surfaces, has a desired angle 134 (relative to the photoreceptor surface) for mounting and setting a cleaning blade 138 (FIG. 6) of the cleaning subassembly 80. Attachment members 140, 142 are provided at the raised rear end 112 and extending from the first and second side walls 102, 104 respectively, for attaching a module handle 144 to the module housing 100.

As pointed out above, the module housing 100 is the main structure of the all-in-one CRU or process cartridge module 44, and importantly supports all other subassemblies (cleaning subassembly 80, charging subassembly 76, developer subassembly 78, and sump subassembly 82) of the all-in-one process cartridge module 44. As such, it is designed for withstanding stresses due to various dynamic forces of the subassemblies, for example, for providing a required re-action force to the developer subassembly 78. Because it is located just about 3 mm below the fuser module 46, it is therefore made of a plastic material suitable for withstanding relatively high heat generated from the fuser module.

Mounts (not shown) to the developer subassembly within the trough portion of the module housing subassembly are located such that the top wall 106 of the module housing defines a desired spacing comprising the first light path 122 between it and the top 146 of the developer subassembly. Similarly, the raised rear end 112 of the top wall 106 of the module housing is also such as to define a desired spacing between the charging subassembly 76 and the photoreceptor or drum 84, when both are mounted to the raised rear end 112 of the module housing 100. Additionally, the module housing 100 provides rigidity and support to the entire process cartridge module 44, and upon assembly mutually self-aligns the CRU or process cartridge module 44 relative to abutting modules such as the CIM 22, and ECS/PS module 30.

Referring in particular to FIG. 2, the first side wall 102 includes electrical connectors 148, 150 for supplying power from the ECS/PS module 30 (FIG. 1) via the sump subassembly 82 to the charging subassembly 76. It also includes an electrical connector 152 for supplying an electrical bias to the developer subassembly 78, as well as an alignment member 154 for aligning the detack device 68 (FIG. 1) to the photoreceptor. As also shown, the first side wall 102 further includes an apertured retainer device 156 for receiving an electrical grounding pin 160 for the photoreceptor 84.

Figure 5:
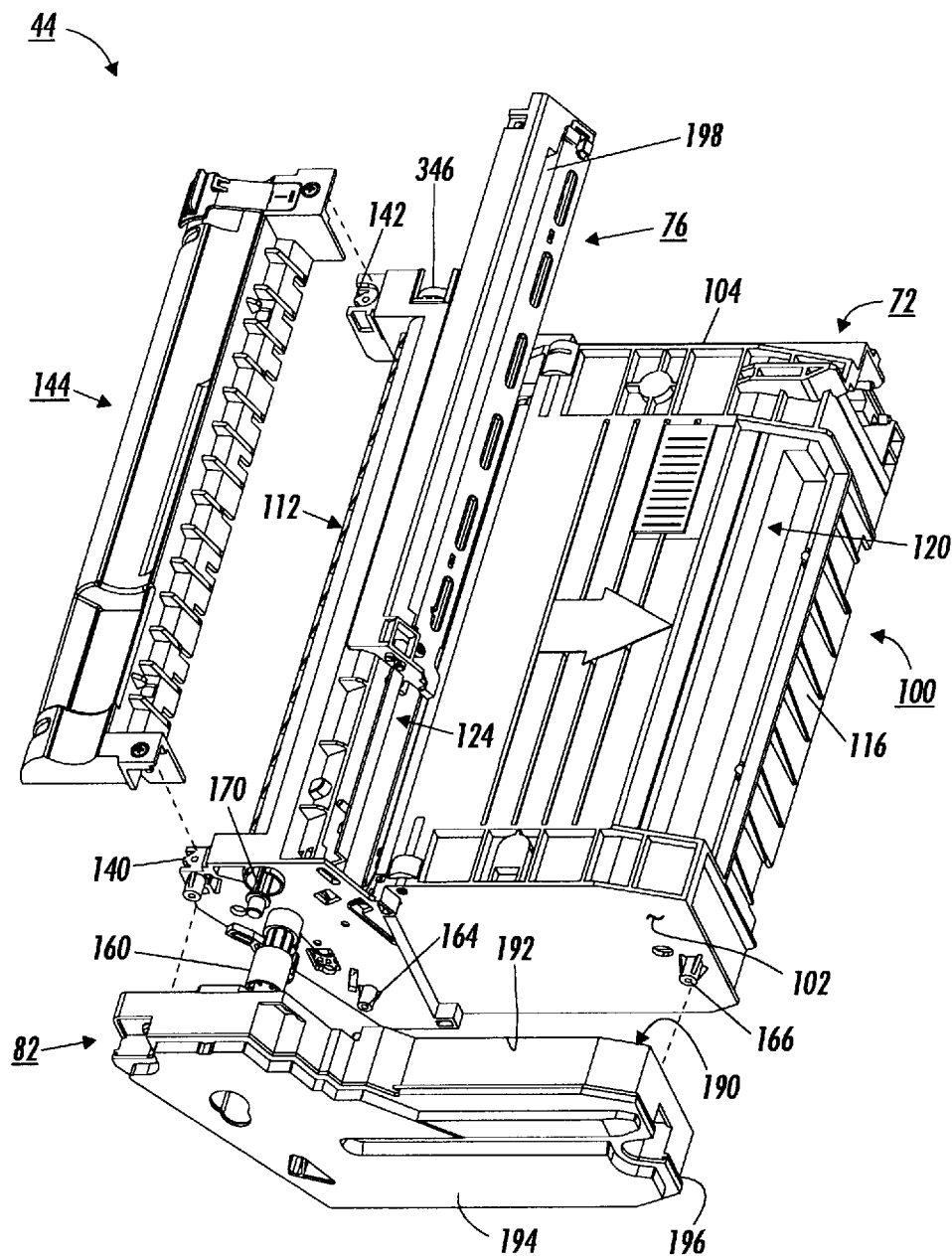
FIG. 5 is an exploded view of the various subassemblies of the CRU or process cartridge module of the machine of FIG. 1.

Importantly, the first side wall 102 further includes mounting members 162, 164, 166 for mounting the sump subassembly 82 to the module housing 100, and an opening for mounting an auger 170 of the cleaning subassembly 80 (FIGS. 1 and 5). The opening 168 also passes waste toner received from the photoreceptor 84 in the raised rear end 112, into the sump assembly 82, when mounted as above.

Referring now to FIG. 3, the developer subassembly 78 of the process cartridge module 44 is illustrated with an expandable bottom member 172 unattached in order to reveal the inside of the developer subassembly. As shown, the developer subassembly 78 comprises a generally rectangular developer housing 174 having the bottom member 172, the top 146, a first side 176, a second and opposite side 178, a front end 180 (relative to cartridge insertion), and a rear end 182. The developer housing 174 is for containing developer material, such as, single component magnetic toner (not shown), and it additionally houses the magnetic developer roll 92 (FIG. 1), a development bias application device 184, and a pair of developer material or toner agitators 186, 188.

Figure 4:
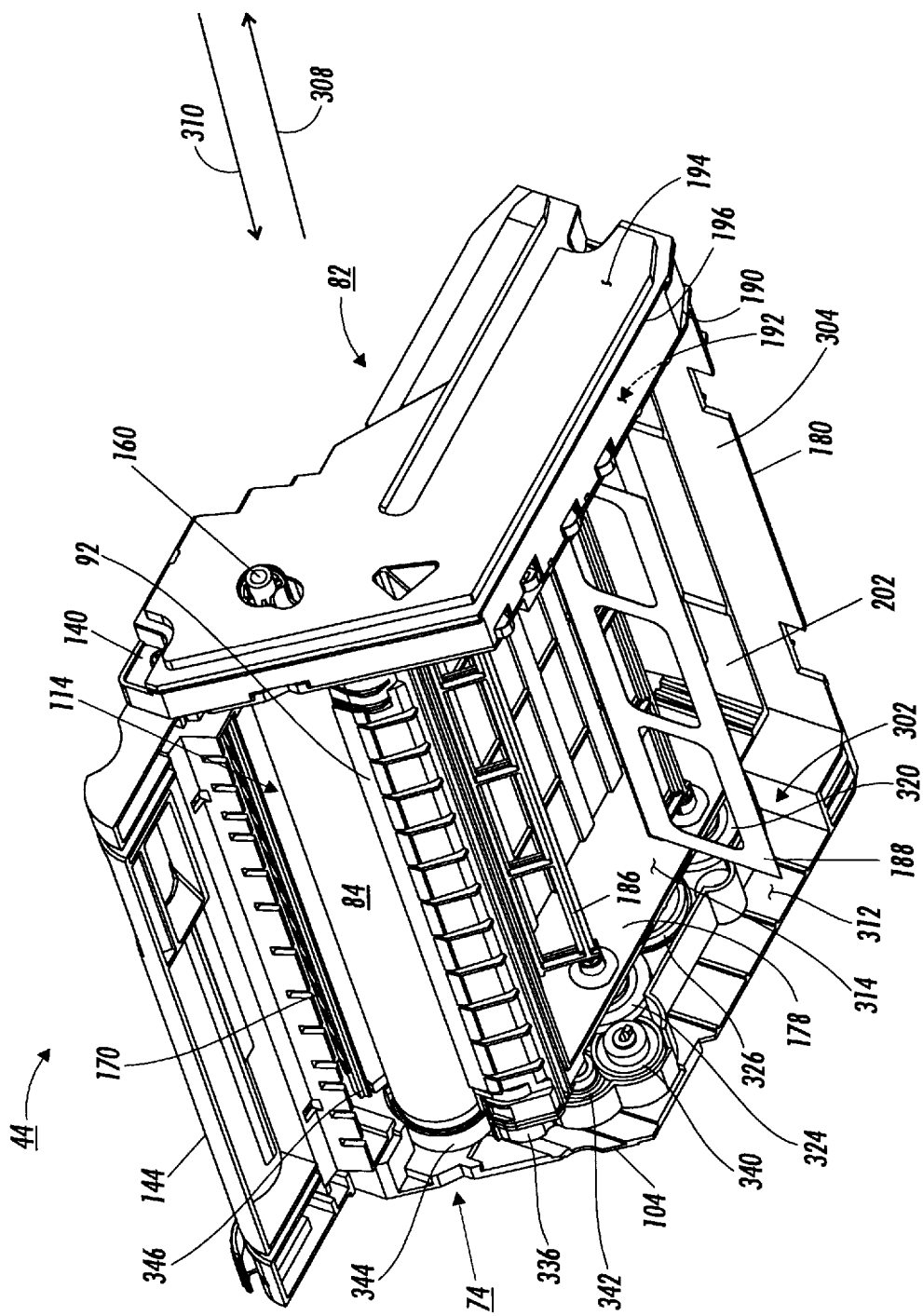
FIG. 4 is an open bottom perspective view of the CRU or process cartridge module of the machine of FIG. 1.

As shown in FIG. 4, the developer subassembly 78 is mounted to the module housing 100, and inside the trough region 118. With the bottom member 172 of the developer housing removed (for illustration purposes only), the agitators 186, 188 can clearly be seen. Also shown in FIG. 4 are the photoreceptor or drum 84 mounted within the raised rear end 112 of the module housing 100, as well as, the module handle 144 attached to the side walls 102, 104 at the raised rear end 112. The whole sump subassembly 82 is further shown with an outside surface 190 of its inside wall 192, mounted to the first side wall 102 of the module housing 100. The outside surface 194 of the outside wall 196 of the sump assembly is also clearly visible. The inside wall 192 and outside wall 196 partially define the sump cavity (not shown) for containing received waste toner, as above.

Referring now to FIG. 5, there is presented an exploded perspective view of the various subassemblies, as above, of the CRU or process cartridge module 44. As shown, the module handle 144 is attachable to mounting members 140, 142 at the raised rear end 112 of the module housing 100, and the sump subassembly 82 is mountable to the first side wall 102 of the cartridge housing. The developer subassembly 78 is mounted within the trough region 118 of the module housing 100, and is partially visible through the first cutout 120. Advantageously, the developer subassembly fits into the trough region 118 such that the top 146 (FIG. 3) of the developer subassembly and the inside of the top wall 106 of the module housing define the first light path 122 for the exposure light 88 from the ROS 38 (FIG. 1). As also shown, the charging subassembly 76 is mountable, at the second cutout 124, to the module housing 100, and includes a slit 198, through the charging subassembly, that defines part of the second light path 126 for the erase light 128 to pass to the photoreceptor 84.

Figure 6:
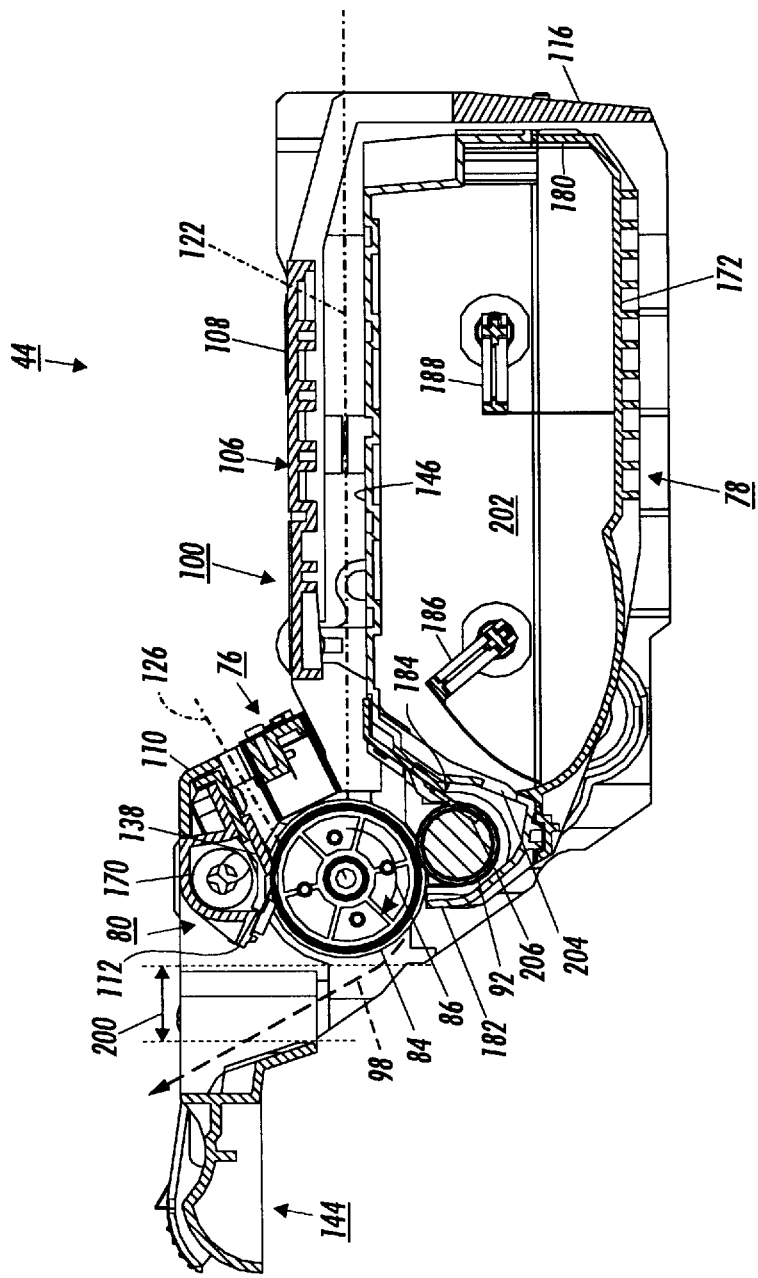
FIG. 6 is a vertical section (front-to-back) of the CRU or process cartridge module of the machine of FIG. 1.

Referring next to FIG. 6, a vertical (rear-to-back) section of the CRU or process cartridge module 44 as viewed along a vertical plane of FIG. 5 is illustrated. As shown, the developer subassembly 78 is mounted within the trough region 118 of the module housing subassembly 72 as defined in part by the front end wall 116, the second side wall 104, and the top wall 106 of the module housing subassembly. The module handle 144 as attached to mounting members 140, 142, (only one of which is visible), forms a portion of the sheet or paper path 98 of the machine 20 (FIG. 1) by being spaced a distance 200 from photoreceptor 84 in the raised rear end 112 of the module housing 100. The photoreceptor or drum 84 is mounted to the side walls 102, 104, (only one of which is visible), and as shown is located within the raised rear end 112 and is rotatable in the direction of the arrow 86. The charging subassembly 76 is mounted within the second cutout 124 in the top wall 106 and includes the slit 198 defining part of the second light path 126 for erase light 128 to pass to the photoreceptor 84. Upstream of the charging subassembly 76, the cleaning subassembly 80, including the cleaning blade 138 and the waste toner removing auger 170, is mounted within the raised rear end 112, and into cleaning contact with the photoreceptor 84. As further shown, the top wall 106 of the module housing 100 is spaced from the top 146 of the developer subassembly 78, thus defining the part of first light path 122 for the exposure light 88 from the ROS 38 (FIG. 1). The first light path 122 is located so as to be incident onto the photoreceptor at a point downstream of the charging subassembly 76.

The front 180, top 146, and bottom member 172 of the developer subassembly define a chamber 202, having an opening 204, for containing developer material (not shown). The first and second agitators 186, 188 are shown within the chamber 202 for mixing and moving developer material towards the opening 204. The developer material biasing device 184 and a charge trim and metering blade 206 are mounted at the opening 204. As also shown, the magnetic developer roll 92 is mounted at the opening 204 for receiving charged and metered developer material from such opening, and for transporting such developer material into a development relationship with the photoreceptor 84.

Referring now to FIG. 4, the process cartridge 72, including planar drive train 302 is shown. The process cartridge 72 includes a process cartridge housing 304 about which development cartridge 78 rotates. The process cartridge 72 and the development cartridge 78 support rotating elements that have an axis of rotation which extends in the direction of arrows 308 and 310.

As shown in FIG. 4, the planar drive train 302 is positioned in a plane between process cartridge end wall 312 and developer cartridge end wall 314. The gears which rotate the members shown in the process cartridge 72 thus form a planar drive train 302 between the end walls 312 and 314.

As shown in FIG. 4, the first member 188 in the form of a first agitator or paddle is rotatably secured to the developer cartridge 78. A first paddle gear 320 is connected to the first paddle 188 and is positioned outside end wall 314 of the developer cartridge 78. Similarly, a second member in the form of second paddle 186 is likewise rotatably mounted to the developer cartridge 78 and is operably connected to a second paddle gear 324 located external to the end wall 314 of the developer cartridge 78. The first idler gear 326 is positioned between the first paddle gear 320 and the second paddle gear 324 and is likewise positioned outside end wall 314 of the developer cartridge 78.

Developer roll 92 is likewise mounted to the developer cartridge 78. On the other hand, photoconductive drum 84 and waste toner auger 334 are rotatably mounted to the process cartridge 72.

The development roll 92 is rotated by development roll gear 336 mounted on developer roll 92 and extending outwardly from end wall 314 of the developer cartridge 78. Second idler gear 340 is connected to the second paddle gear 324. Third idler gear 342 is connected to the second idler gear 340. Developer roll gear 336 is connected to the third idler gear 342. The second idler gear 340 and the third idler gear 342 are mounted to gear housing 308 which is mounted to end wall 314 of the developer cartridge 78.

Photoconductive drum gear 344 is mounted to end wall 312 of the process cartridge 72 and mates with developer roll gear 336. Waste toner auger gear 346 is likewise mounted to end wall 312 of process cartridge 72. Waste tone auger gear 346 mates with photoconductive drum gear 344.

Figure 7:
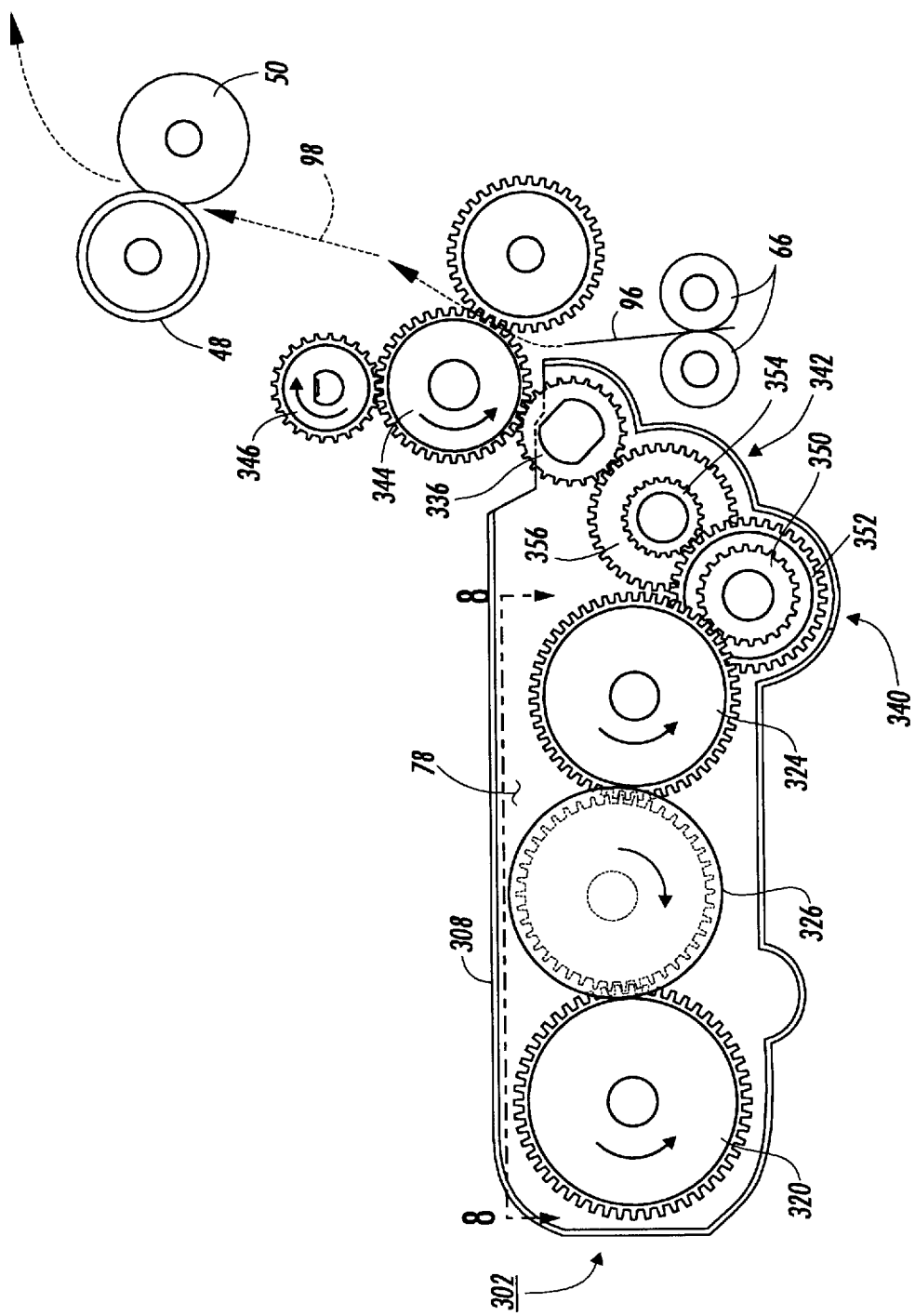
FIG. 7 is a plan view of a gear train for use in the CRU or process cartridge module of FIG. 2 utilizing the planar gear train according to the present invention.

Referring now to FIG. 7, the gears which comprise the planar drive train 302 are shown in greater detail. The first agitator gear 320, the first idler gear 326, and the second agitator gear 324 are mounted to the developer cartridge 78. The gears 320, 324, and 326 are as shown in FIG. 7 spur gears. The first and second agitator gears 320 and 324 have approximately the same size and rotate with approximately the same angular velocity. The idler gear 326 serves to permit the first and second agitator gears 320 and 324 to rotate in the same direction to advance the marking particles towards the developer roll 330 (see FIG. 4).

The second idler gear 340 and the third idler gear 342 are mounted to gear housing 308 which is mounted to the developer cartridge 78. The second idler gear 340 includes a first small set of teeth 350 and a second large set of teeth 352. As shown in FIG. 7, the first set of teeth 350 and second set of teeth 352 on the second idler gear 340 are spur gears.

The third idler gear 342 includes a first small set of teeth, which as shown in FIG. 7 are spur teeth. The third idler gear 342 also includes a second large set of teeth 356 which as shown in FIG. 7 include helical teeth. The second set of teeth 356 of the third idler 342 mesh with developer roll gear 336. Developer roll 336 is thus likewise a helical gear. Developer roll gear 336 is mounted to process cartridge 72.

The photoconductive drum gear 344 is mounted to the process cartridge 72 and meshes with developer roll gear 336. The waste toner auger gear 346 is mounted to process cartridge 72 and meshes with photoconductive drum gear 344.

The first idler gear 326, the second idler gear 340, the developer roll gear 336, and the waste toner auger gear 346 may be made of a second different material from what previously mentioned, for example, of a material different than acetyl, for example, polycarbonate. Other suitable materials include compounds of Delrin™, a trademark of duPont (UK) Ltd., for example Delrin™ 8903.

Figure 8:
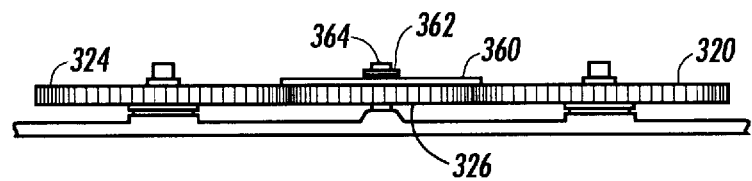
FIG. 8 is a cross sectional view of FIG. 7 along the line 8—8 in the direction of the arrows.

Referring now to FIG. 8, the first agitator gear 320, the first idler gear of 326, and the second agitator gear 324 are shown in greater detail. As shown in FIG. 8, the first idler gear preferably includes a outer collar or lip 360 which extends past the first agitator gear 320 and past the second agitator gear 324. The lip 360 provides an axial restraint for the gears 320 and 324. Thus, the agitator gears 320 and 324 do not require a snap ring or other device to maintain their axial position. The first idler gear, however, includes a snap ring 362 which is positioned between the first idler gear 326 and the first idler gear shaft 364. The use of the lip 360 may eliminate the need for retaining rings on the mating gears 320 and 324.

Figure 10B:
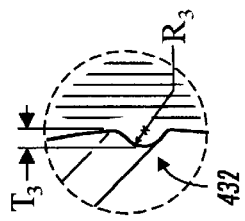
FIG. 10B is an enlarged view of the second fit enhancing feature shown in FIG. 10.
Figure 10:
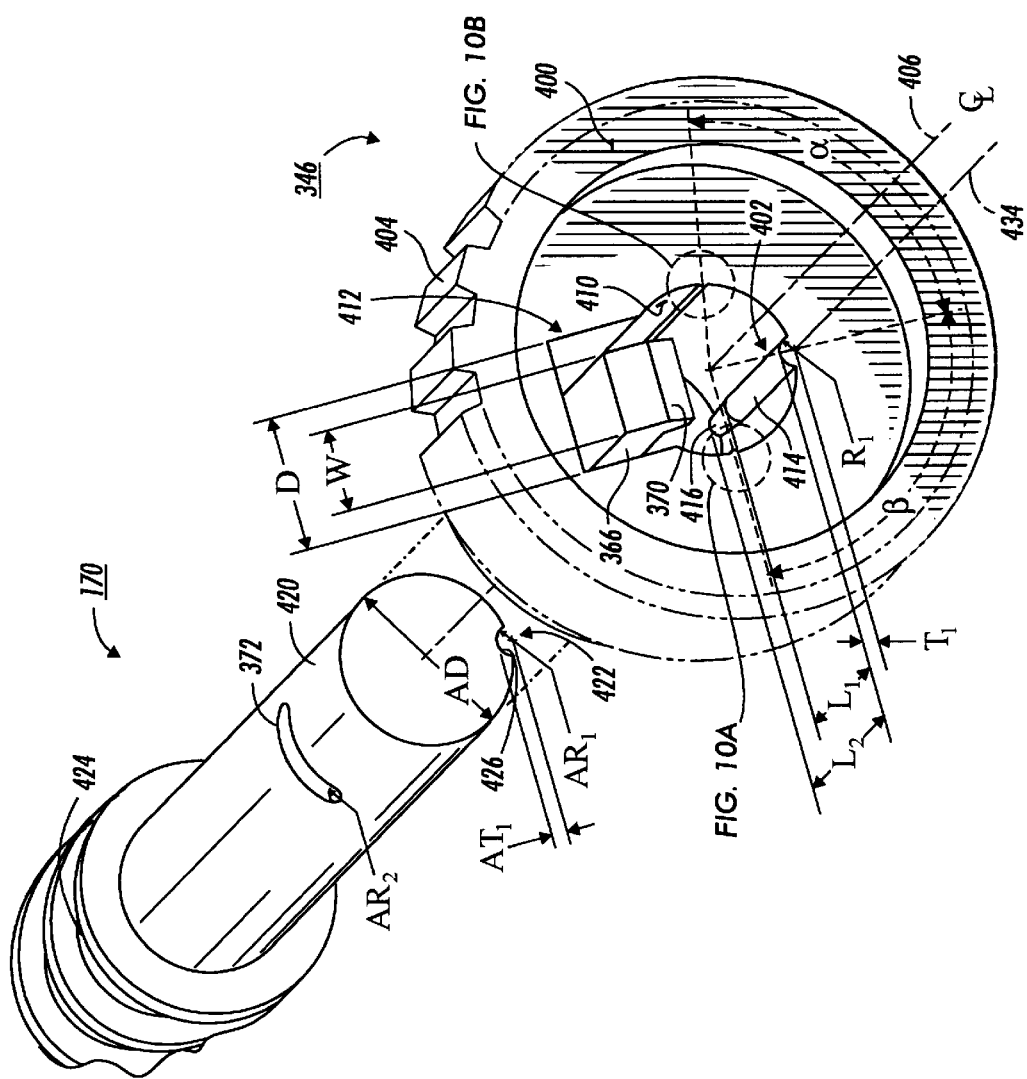
FIG. 10 is a perspective view of a gear with the positive gear mounting feature according to the present invention including first and second fit enhancing features.

Referring now to FIG. 10, waste toner auger gear 346 is shown in greater detail. The waste toner auger gear 346 is preferably made from an integral piece of plastic, for example, acetyl or polycarbonate. Other suitable materials include compounds of Delrin™, a trademark of duPont (UK) Ltd., for example Delrin™ 8903. The waste toner auger gear 346 includes a flexible inner arm 366 which extends axially adjacent the bore 368 of the gear 346. The arm 366 includes a protrusion 370 which extends inwardly from the bore 368 of the gear 346. The protrusion 370 of the gear 346 matingly fits with notch 372 formed on shaft 374 of auger 334. The protrusion 370 mates with the notch 372 to provide axial restraint for the gear 346. The use of the notch 372 and the protrusion 370 eliminates the need for a retaining ring or snap ring to maintain the position of the gear.

Referring again to FIG. 1, the copy sheets 96 pass along many rotating components from their initial position within copy sheet modules 22 and 24 along copy sheet path 98 toward the exit tray 54. These rotating items include the fuser rolls 48 and 50, the sheet registration rolls 66, as well as the magnetic developer roll 92 and photoconductive drum 84. Each of these rotating components must be driven by a suitable method. For example, by a gear train including a gear located on a particular rotating element. Several of these rotating elements, in particular, the magnetic developer roll 92 and the photoconductive drum 84 are located within the process cartridge module 44.

Referring now to FIG. 6, the paper path 98 is shown as it passes by magnetic developer roll 92 and photoconductive drum 84. In addition to the roller 92 and the drum 84, additional rotating components are located within the process cartridge 44. For example, agitators 186 and 188 rotate within the process cartridge 44 to advance and admix the toner. Further, a waste toner auger 170 is utilized to advance waste toner toward the waste toner sump 82 (see FIG. 5). Each of these rotating components may utilize the positive gear mount of the present invention. For example, the positive gear mount may be used on the waste toner auger 170.

According to the present invention and referring to FIG. 5, the waste toner auger 170 with rigid interference gear mount is shown in greater detail. The auger 170 extends from first side wall 102 to second side wall 104. The auger 170 is secured to waster toner gear 346 adjacent the second side wall 104. The waste toner gear 346 serves to rotate the auger 170 in order that waste toner may be advanced toward waste toner sump 82 located adjacent first side wall 102.

Referring again to FIG. 4, the waste toner auger gear 346 is shown as part of the planar drive train 302. The planar drive train 302 is housed within gear housing 308. The waste toner auger gear 346 is adjacent to and meshes with photoconductive drum gear 344.

Referring now to FIG. 7, the planar drive train 302 is shown in greater detail. By referring to FIG. 7, it should be appreciated that the planar drive train 302 includes a number of gears which interact with each other and many of which interact with the photoconductive drum gear 344 and the developer roll gear 336. The developer roll gear 336 and the photoconductive drum gear 344 in particular have a significant impact on the copy quality of sheets 96 as they pass along paper path 98.

Referring now to FIG. 10, a rigid interference gear mount according to the present invention is shown in waste toner gear 346. The gear 346 includes a body 400. The body 400 includes a torque transmitting feature 402 as well as a torque transferring feature 404. The body 400 rotates about axis of rotation 406.

The torque transferring feature 404 may take the form of any feature capable of transferring torque, i.e., be in the form of gear teeth as shown in FIG. 10, a timing belt, a V-belt, or a cam. The torque transferring feature 404 serves to transfer torque to or from the body 400 toward another mechanical component within the printing machine, for example, gear 344 (see FIG. 7). The torque transferring feature 404 may, as shown in FIG. 10, be integrally formed within the drive member 346 or be a separate component secured to body 400. The gear teeth may be helical teeth, spur teeth, or any other gear tooth form which may transfer torque.

The torque transmitting feature 402 may take any form which permits the transfer of torque from the torque transmitting feature 402 to a member, for example, auger 170 rotating about axis 424 coincident with axis of rotation 406 of the gear 346.

It should be appreciated that the torque transmitting feature may be in the form of internal gear teeth located in a bore (not shown) of a gear (not shown) and that the torque transmitting feature may be used to secure the gear to a housing (not shown). Preferably, however, as shown in FIG. 10, the torque transmitting feature 402 is in the form of a protrusion extending from an aperture periphery 410 of aperture 412 of the body 400.

While as shown in FIG. 10 the protrusion 402 is a solitary protrusion, it should be appreciated that a plurality of protrusions may extend from the periphery 410 of the aperture 412 of the body 400. The plurality of protrusions may be equally spaced or alternatively be positioned in any suitable spaced apart arrangement.

The protrusion 402 may have any suitable shape capable of transmitting torque. For example, the torque transmitting feature may have a rectangular shape, triangular shape or a polygon shape. Preferably, the protrusion 402 has a shape that maximizes the strength of the protrusion while optimizing the ability of the protrusion to cooperate with a like feature on the mating part such that the mating part and the drive member 346 are securely interconnected. One such shape of a protrusion is in the form of the arcuate protrusion 402 as shown in FIG. 10.

To provide for simple and reliable assembly of the drive member 346 into the mating component, the protrusion 402 has a generally uniform cross section so that the mating member may be assembled along the axis of rotation 406. The protrusion 402 may include a cylindrical portion 414 as well as a conofrustrical or tapered portion 416 extending from one end of the cylindrical portion 414. The tapered portion 416 serves to provide a guide or lead to ease the assembly of the auger 170 into the protrusion 402 of the body 400 of the drive member 346.

The protrusion 402 may be defined by a radius $R_1$ extending a distance $T_1$ from the periphery 410 of the body 400. For a drive member 346 with the aperture 412 having a diameter D of approximately 0.20 inches, the protrusion 402 has been found to be effective with a radius $R_1$ of approximately 0.020 inches and having a distance $T_1$ of approximately 0.025 inches. Thus, the drive member 346 has been found to be effective with a radius $R_1$ of approximately 5 to 30 percent of the diameter D of the aperture 412 and with a distance $T_1$ of approximately 6 to 20 percent of the diameter D of the aperture 412. Preferably, the protrusion 402 extends substantially the length of the body 400 along axis of rotation 406. The cylindrical portion 414 preferably extends for a distance of 40 to 95 percent of the length of the body 400 along the axis of rotation 406. The cylindrical portion 414 thus has a length $L_1$ which is approximately 30 to 95 percent of the length $L_2$ of the aperture 412.

The gear 346 mates with a rotating member, for example, in the form of waste toner auger 170. The auger 170 preferably has an outer periphery 420 which closely conforms with aperture periphery 410 of the gear 346. The outer periphery 420 of the auger 170, thus, is preferably defined by a diameter AD which is matingly fitted with diameter D of the gear 346. The auger 170 preferably includes an axially extending peripheral groove 422.

The groove 422 is matingly fitted with protrusion 402 of the gear 346. The groove 422 extends with a uniform cross section in the direction of longitudinal axis 424 of the auger 170. For a protrusion 402 with a cylindrical shape as shown in FIG. 10, the groove 422 is, thus, cylindrically shaped similarly to the protrusion 402 and has a groove periphery 426 defined by radius $AR_1$ and has a depth $AT_1$ from the periphery 420 of the auger 170.

Preferably, to prevent relative rotational motion between the auger 170 and the gear 346, the protrusion 402 is interferencely fitted with the groove 422 of the auger 170. Thus, for example, the radius $AR_1$ is slightly smaller than the radius $R_1$ of the protrusion 402 and, similarly, the depth $AT_1$ of the groove 422 is slightly less than the height $T_1$ of the protrusion 402.

According to the present invention, the gear 346 further includes the rigid interference gear mount in the form of a fit enhancing feature 430 extending inwardly from aperture periphery 410 of the body 400. The fit enhancing feature 430 serves to assure that the auger 170 is securely fitted with the aperture 412 of the body 400. The fit enhancing feature 430 mates with the outer periphery 420 of the auger 170 and is deformed as the auger 170 is inserted within the aperture 412.

Figure 10A:
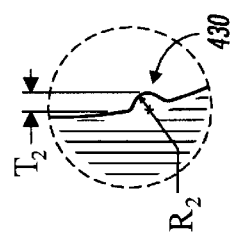
FIG. 10A is an enlarged view of the first fit enhancing feature shown in FIG. 10.

The fit enhancing feature 430 may have any suitable shape. For example, the fit enhancing feature 430 may be rectangular, triangular, polygon or arcuate in shape. For example, as shown in FIG. 10A, the fit enhancing feature may be cylindrical and may be defined by a radius $R_2$ which extends a distance $T_2$ from the aperture periphery 410.

While the gear 346 may include a solitary fit enhancing feature, preferably, a plurality of fit enhancing features may be provided. For example, referring to FIG. 10B, the gear 346 may further include a second fit enhancing feature 432 spaced from the first fit enhancing feature 430. The second enhancing feature 432 may be similar to the first enhancing feature 430. For example, the second enhancing feature 432 may include a cylindrical shape including a radius $R_3$ and extending inwardly from aperture periphery 410 a distance, for example, $T_3$. Depending on the materials utilized for the manufacture of the drive member 346, the radii $R_2$ and $R_3$ and the distances $T_2$ and $T_3$ are preferably selected to provide for an optimum interference fit between the auger 170 and the gear 346. For example, when utilizing a plastic for the gear 346, the radii $R_2$ and $R_3$ may be 0.001 inches to 0.015 inches with 0.05 inches being preferred and the distance $T_2$ may be from 0.001 to 0.015 inches with 0.05 inches being preferred. The radii $R_2$ and $R_3$ are preferably approximately 0.5 percent to 7.5 percent of the diameter D.

The fitted enhancing features 430 and 432 may be positioned anywhere about the periphery of the aperture 412 and may be positioned at angles α and β respectively from the centerline 434 of the protrusion 402. The values of α and β may each be 90 degrees to provide for equally spaced apart fit enhancing features. The fit enhancing features 430 and 432 may include a chamfer or lead area (not shown). The chamfer lead feature may assist in the assembly of the auger 170 onto the gear 346.

The drive member 346 may be made of any suitable durable material capable of transferring torque. For example, the drive member 346 may be made of a metal or plastic. Preferably, the drive member 346 is made from an integral piece of plastic, i.e. acetyl or polycarbonate. Other suitable materials include compounds of Delrin™, a trademark of duPont (U.K) Ltd., for example, Delrin™ 8903.

Figure 11:
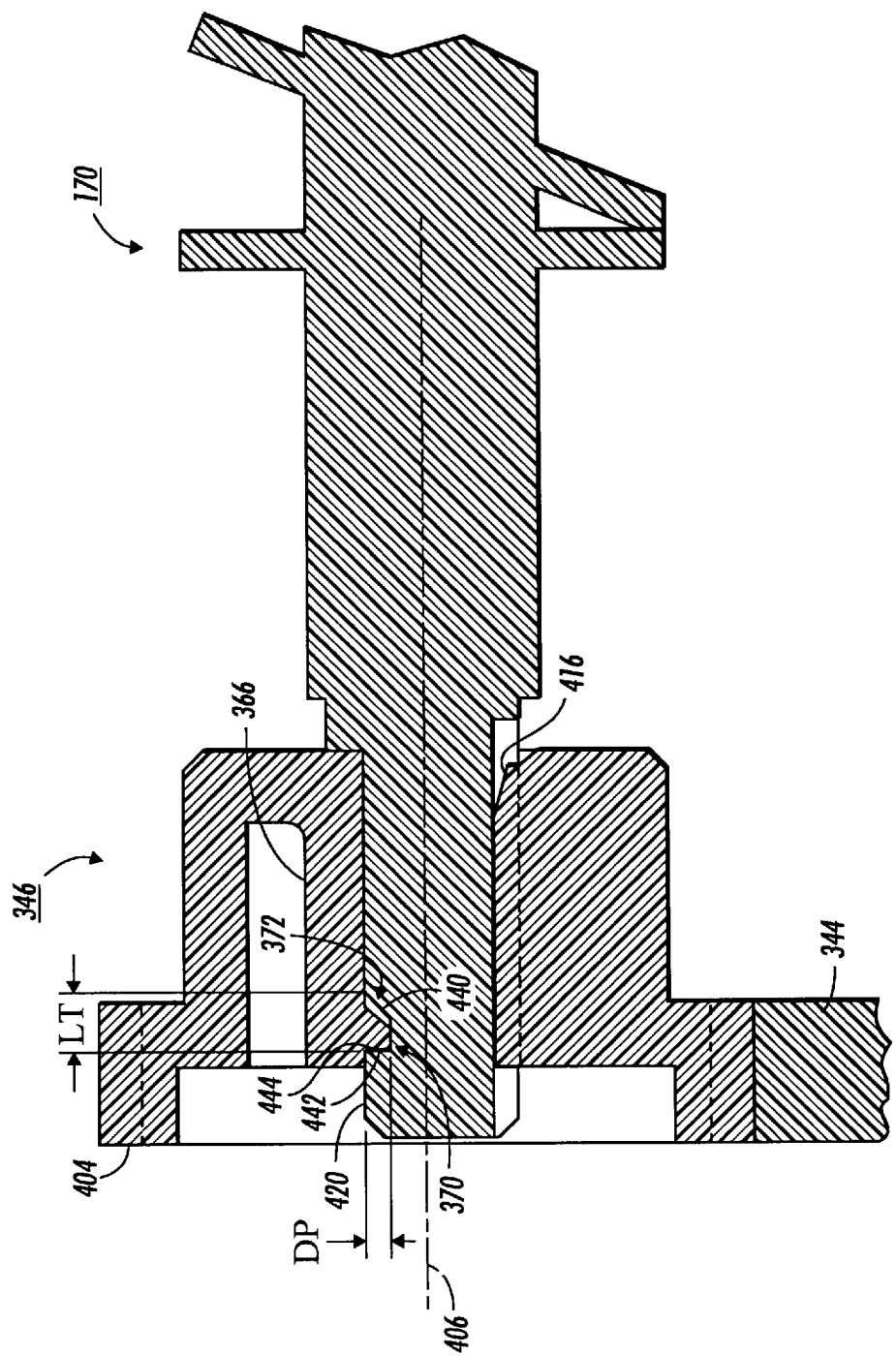
FIG. 11 is a cross sectional view of FIG. 8 along the line 11—11 in the direction of the arrows.
Figure 12:
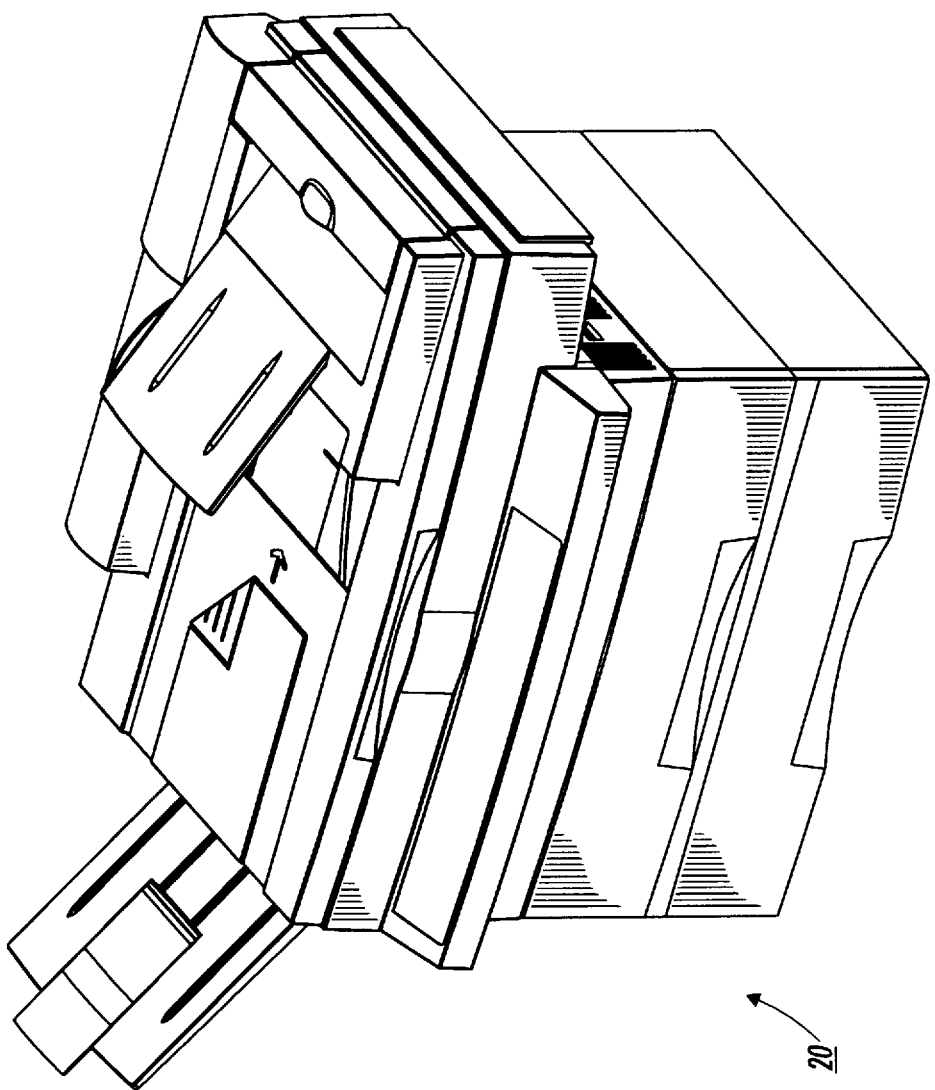
FIG. 12 is a perspective view of the machine of FIG. 1.

Referring now to FIG. 11, the drive member 346 is shown assembled onto auger 170. The drive member 346 is in engagement with photoconductive drive gear 344. Torque is thus transferred from the photoconductive drive gear 344 to the auger drive gear 346. The drive member 346 may be secured to the auger 170 by any suitable fashion, i.e. by glue or by fasteners. Preferably, however, the drive member 346 is secured to the auger 170 by an axial retaining feature 366 in the form of a flexible inner arm. The flexible inner arm 366 includes a protrusion in the form of an axial retaining protrusion 370. The retaining protrusion 370 matingly fits with a notch 372 formed in the outer periphery 420 of the auger 170.

During assembly, the flexible inner arm 366 flexes outwardly to permit the outer periphery 420 of the auger 170 to seat fully with the drive member 346. Upon being completely fitted within the auger 170, the flexible inner arm 366 is urged inwardly and permits the notch 372 to be matingly fitted with the axial retaining protrusion 370 to secure the drive member 346 onto the auger 170.

The notch 372 and the protrusion 370 are preferably closely conforming to each other. The protrusion 370 may have any suitable shape but preferably includes a tapered portion 440 on one end of the protrusion 370 to assist in the flexing of the inner arm 366 during assembly. The protrusion 370 further includes a vertical wall 442 perpendicular to axis of rotation 406 of the drive member 346. The vertical wall 442 mates with a vertical wall 444 on the notch 372 providing for position retention along axis of rotation 406 for the drive member 346 with respect to the auger 170.

The protrusion 370 may have any suitable size, i.e. the protrusion may have a depth DP of approximately 0.01 to 0.14 inches and a length LP of approximately 0.15 to 0.45 inches. The chamfer 440 may have a lead in angle of for example 45 degrees.

Referring again to FIG. 4, it should be appreciated that while the drive member 346 of the present invention is shown in detail as the auger drive gear 346 of FIGS. 10 and 11, it should be appreciated that the positive gear mount arrangement of the present invention is well suited for any drive mounting apparatus including any and all of the gears in the planar drive train 302. For example, the positive gear mount arrangement of the present invention may be utilized in the photoconductive drum gear 344, the developer roll gear 36 as well as any other of the gear included in the planar drive train.

Referring now to FIG. 7, the gears in the planar drive train 302 are shown in greater detail. The paper path 98 is shown in relationship to the planar drive train as paper path 98. A sheet 96 passes along the paper path 98. The sheet 98 is driven through sheet registration rolls 66 and passes by photoconductive drum (not shown) driven by photoconductive drum gear 344. Further, the sheet 96 passes between the fuser rolls 48 and 50. The positive gear mount arrangement of the present invention is particularly well suited for those drive components which advance the sheet 96. This is particularly true for the components which drive the sheet 96 as the xerographic image is applied and developed along the paper path 98.

For example, the positive gear mount arrangement is particularly well suited for the photoconductive drum gear 344 as well as for the developer roll gear 336 which drives the developer roll which applies developer to the photoconductive drum. Further, the positive gear mount arrangement is well suited for gears (not shown) which drive the sheet registration rolls 66 and for gears (not shown) which drive the fuser rolls 48 and 50.

By providing a drive member with a fit enhancing feature, a drive member may be provided which has minimal relative motion between the drive member and its mating part.

By providing a fit enhancing feature in the form of a protrusion extending from the surface of the bore of the drive member, an interference fit may be easily had between the drive member and a mating part.

By providing a fit enhancing feature including an arcuate protrusion, a simple inexpensive low assembly force and durable interference fit may be had between a drive member and a mating part which will not have relative motion therebetween.

By providing a fit enhancing feature with a cylindrical portion and a tapered portion, a fit enhancing feature may be had which provides for easy assembly of the drive member onto the mating part.

By providing a positive gear mount arrangement with a protrusion extending from a drive member which is interferencingly fitted with a shaft, relative motion between the shaft and the drive member may be assured.

By providing a torque transmitting feature with an arcuate shape on a drive member matingly fitted with an arcuate feature on the shaft, a simple, durable, inexpensive torque transferring method may be obtained which prevents relative motion between the shaft and the drive member.

By providing a drive member with a protrusion that includes a tapered lead in surface, a torque transferring feature may be positioned on a drive member which may be easily and simply fitted onto a shaft.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A drive member for use in a printing machine, said drive member cooperating with a drive shaft to transfer torque therebetween, said drive member cooperating with a torque transferring component to transfer torque therebetween, said drive member comprising:
    a body, said body defining an aperture therein, said body defining an axis of rotation thereof;
    a torque transferring feature associated with said body for transferring torque between said body and the torque transferring component; and
    a fit enhancing feature extending from said body toward the aperture for enhancing the fit between said body and the drive shaft.

2. A drive member according to claim 1, wherein said fit enhancing feature comprises a protrusion extending from said body in the direction of the axis of rotation.

3. A drive member according to claim 2 wherein said fit enhancing feature provides an interference fit between the drive shaft and said body.

4. A drive member according to claim 1, further comprising a second fit enhancing feature spaced from said first mentioned fit enhancing feature.

5. A drive member according to claim 1, further comprising a torque transmitting feature extending from the body in the direction of the axis and spaced from said fit enhancing feature, at least a portion of the torque transmitting feature having an arcuate periphery.

6. A drive member according to claim 5 wherein said torque transmitting feature is adapted to cooperate with a drive shaft feature on the drive shaft.

7. A drive member according to claim 6:
    wherein the drive shaft feature comprises a groove; and
    wherein said torque transmitting feature comprises a protrusion.

8. A drive member according to claim 5 wherein at least a portion of said torque transmitting feature has a cylindrical segment shape having a longitudinal axis parallel to the axis of rotation of said body.

9. A drive member according to claim 1, further comprising a drive member axial retaining feature spaced from the torque transmitting feature for cooperation with a drive shaft retaining feature to provide axial retention of the drive member in a direction parallel to the axis of rotation.

10. A drive member according to claim 1, wherein said drive member axial retaining feature comprises a resilient member integral with said body.

11. A process cartridge for use in a printing machine comprising, said process cartridge including:
    a torque transferring component;
    a drive shaft; and
    a drive member cooperating with said drive shaft, said drive shaft adapted to transfer torque therebetween, said drive member cooperating with said torque transferring component to transfer torque therebetween, said drive member including a body, said body defining an aperture therein, said body defining an axis of rotation thereof, said drive member further including a torque transferring feature associated with said body for transferring torque between said body and the torque transferring component, said drive member further including a fit enhancing feature extending from said body toward the aperture for enhancing the fit between said body and the drive shaft.

12. A process cartridge according to claim 11, wherein said fit enhancing feature comprises a protrusion extending from said body in the direction of the axis of rotation.

13. A process cartridge according to claim 12 wherein said fit enhancing feature provides an interference fit between the drive shaft and said body.

14. A process cartridge according to claim 11, further comprising a second fit enhancing feature spaced from said first mentioned fit enhancing feature.

15. A process cartridge according to claim 11, further comprising a torque transmitting feature extending from the body in the direction of the axis and spaced from said fit enhancing feature, at least a portion of the torque transmitting feature having an arcuate periphery.

16. A process cartridge according to claim 15 wherein said torque transmitting feature is adapted to cooperate with a drive shaft feature on the drive shaft.

17. A process cartridge according to claim 16:
    wherein the drive shaft feature comprises a groove; and
    wherein said torque transmitting feature comprises a protrusion.

18. A process cartridge according to claim 15 wherein at least a portion of said torque transmitting feature has a cylindrical segment shape having a longitudinal axis parallel to the axis of rotation of said body.

19. A process cartridge according to claim 11, further comprising a drive member axial retaining feature spaced from the torque transmitting feature for cooperation with a drive shaft retaining feature to provide axial retention of the drive member in a direction parallel to the axis of rotation.

20. A process cartridge according to claim 11, wherein said drive member axial retaining feature comprises a resilient member integral with said body.

21. An electrophotographic printing machine of the type including a process cartridge comprising:
    a torque transferring component;
    a drive shaft; and a drive member cooperating with said drive shaft, said drive shaft adapted to transfer torque therebetween, said drive member cooperating with said torque transferring component to transfer torque therebetween, said drive member including a body, said body defining an aperture therein, said body defining an axis of rotation thereof, said drive member further including a torque transferring feature associated with said body for transferring torque between said body and the torque transferring component, said drive member further including a fit enhancing feature extending from said body toward the aperture for enhancing the fit between said body and the drive shaft.

22. A printing machine according to claim 21, wherein said fit enhancing feature comprises a protrusion extending from said body in the direction of the axis of rotation.

23. A printing machine according to claim 22 wherein said fit enhancing feature provides an interference fit between the drive shaft and said body.

24. A printing machine according to claim 21, further comprising a second fit enhancing feature spaced from said first mentioned fit enhancing feature.

25. A printing machine according to claim 21, further comprising a torque transmitting feature extending from the body in the direction of the axis and spaced from said fit enhancing feature, at least a portion of the torque transmitting feature having an arcuate periphery.

26. A printing machine according to claim 25 wherein said torque transmitting feature is adapted to cooperate with a drive shaft feature on the drive shaft.

27. A printing machine according to claim 26:
wherein the drive shaft feature comprises a groove; and
wherein said torque transmitting feature comprises a protrusion.

28. A printing machine according to claim 25 wherein at least a portion of said torque transmitting feature has a cylindrical segment shape having a longitudinal axis parallel to the axis of rotation of said body.

29. A printing machine according to claim 21, further comprising a drive member axial retaining feature spaced from the torque transmitting feature for cooperation with a drive shaft retaining feature to provide axial retention of the drive member in a direction parallel to the axis of rotation.

30. A printing machine according to claim 21, wherein said drive member axial retaining feature comprises a resilient member integral with said body.

* * * * *